Feb. 20, 1968 H. G. BLANK 3,370,182

SCR SWITCHING CIRCUIT WHEREIN HIGH SERIES IMPEDANCES PREVENT AVALANCHE BREAKDOWN OF SCR'S

Filed Oct. 4, 1965 2 Sheets-Sheet 1

INVENTOR.
HANS G. BLANK

BY

R. J. Frank

ATTORNEY.

Feb. 20, 1968 H. G. BLANK 3,370,182

SCR SWITCHING CIRCUIT WHEREIN HIGH SERIES IMPEDANCES PREVENT AVALANCHE BREAKDOWN OF SCR'S

Filed Oct. 4, 1965 2 Sheets-Sheet 2

INVENTOR.
HANS G. BLANK

BY R. J. Frank
ATTORNEY.

3,370,182
Patented Feb. 20, 1968

3,370,182

SCR SWITCHING CIRCUIT WHEREIN HIGH SERIES IMPEDANCES PREVENT AVALANCHE BREAKDOWN OF SCR'S

Hans G. Blank, Bronx, N.Y., assignor to General Telephone and Electronics Laboratories, Inc., a corporation of Delaware Filed Oct. 4, 1965, Ser. No. 492,813
8 Claims. (Cl. 307—252)

This invention relates to switching circuits and in particular to switching circuits for controlling electroluminescent display devices.

Electroluminescent display devices comprise individual electroluminescent lamps positioned in a predetermined pattern, each lamp being arranged to respond to one or more applied signals. One form of electroluminescent display device is a bar graph wherein a number of lamps are mounted side by side to form an elongated display. Different numbers of lamps may then be excited in accordance with an input signal to form a bar of light of variable length.

The information to be visually displayed is initially expressed in coded form, generally a binary code. This coded information is typically translated into an intermediate coded signal characterized by the presence and absence of D.C. voltage levels. The electroluminescent cells are normally energized to emit light by an A.C. voltage having a predetermined magnitude of the order of several hundred volts and a frequency of several hundred cycles. The application of this A.C. voltage to the different lamps is controlled by the coded D.C. signal. To provide this control, display devices of this type employ switching of handling high A.C. voltages of the order of hundreds of volts.

Among the family of solid-state components, the silicon-controlled rectifier or SCR is found to be especially well-suited for high voltage applications. Briefly, the SCR is a semiconductor element having four successive zones of opposite conductivity type materials. The outer zones are defined as the anode and cathode respectively, and the intermediate zone adjacent the cathode is called the gate. The device is current responsive and is rendered conductive by the application of a positive current to the gate.

The SCR, which is a well known commercially available device, exhibits a relatively small anode-to-cathode current when the current flowing into its gate is small but is driven into an "avalanche" state whenever its gate current is increased above a predetermined value and the anode-to-cathode current has a sufficiently large value. This change in state occurs when the applied electric field and gate currents are sufficient to cause the electrons to gain more energy between collisions than they lose to the lattice during the collisions. As a result, the hole-electron pairs generated thermally produce an avalanche of secondary electrons and holes through the material. Under these conditions, a large current flows between anode and cathode until the SCR is cut off. When a D.C. voltage is applied to the anode of the SCR, the device may be turned off by the application of a negative pulse to the anode sufficient to render the anode negative with respect to the cathode. In the case of an applied A.C. voltage, the negative half-cycle of the voltage effects cutoff when the gate current is removed.

The SCR need not be operated as a bistable device. Generally, the application of a supply voltage across the series combination of a resistor and an SCR results in the anode-to-cathode current increasing when the SCR is rendered conductive. This increase in current may be limited by employing a relatively high impedance series resistor so that the SCR does not enter the high conduction or avalanche state. When the SCR is conducting but is not in the avalanche state, the voltage across the SCR for low values of anode current is very small for either polarity of alternating voltage and therefore substantially the full supply voltage appears across the series resistor during the entire cycle.

If no current is caused to flow into the gate of the SCR, the SCR is not rendered conductive and appears as a relatively high impedance. As a result, substantially the entire supply voltage appears across the SCR. The application of a gate current to the SCR enables the supply voltage to be readily switched from the SCR itself to the series load impedance.

The magnitude of voltage that may be switched is determined primarily by the voltage rating of the SCR. Although SCR's presently available are rated up to several hundred volts, and manufacturing yield decreases for increasing voltage ratings with the result that cost increases significantly. The voltage rating of an SCR is increased either by increasing the thickness of the anode region which reduces the possibility of breakdown or decreasing the impurity level of the anode region.

The SCR characteristics are important in applications wherein the energizing voltage of an electroluminescent device is switched in accordance with a D.C. input signal. To provide the voltage requirements of such a display, an SCR with a high voltage rating was heretofore employed. In addition, certain electroluminescent displays are constructed such that the energizing voltage is normally two signals of opposite polarity, i.e. 180 degrees out of phase. This mode of construction is employed in bar graph displays and the like which perform additional logic functions with the energizing voltage.

Accordingly, an object of the present invention is the provision of a switching circuit capable of producing an output voltage which may be the sum of the voltage ratings of the two SCR's.

Another object is to provide a switching circuit for controlling an electroluminescent display.

A further object of the present invention is to provide a switching circuit capable of providing two output signals of opposite polarity.

In accordance with the present invention, there is provided a switching circuit comprising first and second four-layer semiconductor elements having anode, cathode and gate electrodes. The elements are coupled so that the cathode electrode of the first element is coupled to the gate electrode of the second element. The gate electrode of the first element is coupled to a switching signal input terminal and the cathode electrode of the second element is coupled to a reference potential, i.e. ground. The anode electrodes of the first and second semiconductor elements are coupled to first and second output terminals respectively.

Further, the anode electrode of the first and second semiconductor elements are each coupled through a series impedance to a first and second input terminals respectively. Each series impedance has a value which is relatively high compared to the anode to cathode impedance of the elements when the elements are rendered conductive. In addition, these impedances are selected to be relatively low as compared to the impedance of the load coupled to the output terminals.

When an alternating voltage source is connected to the first and second input terminals but no switching signal is applied to the gate electrode of the first semiconductor element, the first and second elements are nonconductive and exhibit a relatively high impedance compared to the corresponding series impedance. The alternating voltage, in the absence of a switching signal, appears substantially between the anode electrodes of the elements and at the output terminals. The portion of the applied voltage appearing between the anode electrodes is determined by the ratio of the equivalent impedance of the load in parallel with the semiconducting elements to the sum of this equivalent impedance and the impedances coupled in series with the anode electrodes of the semiconducting elements and the input terminals. The equivalent impedance is determined for the semiconducting elements when they are nonconductive and in effect is the parallel combination of the two series semiconductor elements in parallel with the load. Therefore coupling a relatively low impedance compared to the load impedance, in series with the anode and the corresponding input terminal, insures that substantially the entire applied voltage appears across the load. When a load is connected between one of the output terminals and the reference potential, substantially one-half of the alternating voltage appears thereacross. This voltage is 180 degrees out of phase with the voltage appearing across a load similarly connected to the other output terminal. If a single load having an energizing voltage greater than one-half but less than the entire alternating voltage, such as an electroluminescent display, is coupled between both the output terminals, additional logic operations can be performed at each output terminal. For example, electroluminescent displays often have incorporated in their structure a translator utilizing a nonlinear resistive layer in combination with a coded electrode pattern which performs logic operations with one or both of these energizing signals. The load itself in this case operates as an "and" circuit.

If current is now caused to flow into the gate electrode of the first element, this element is rendered conductive so that an anode to cathode current flows therein. This current in turn is supplied to the gate of the second element rendering it conductive. In this case, both semiconductor elements serve as low impedances connected between the reference potential and their respective series impedances. By coupling the anode of the SCR to a relatively high impedance as compared to the conductive anode-to-cathode impedance, the anode-to-cathode current can be limited for a given applied voltage so that the SCR is prevented from entering the avalanche state. The magnitude of the impedance selected is determined by the peak magnitude of the energizing voltage. When the SCR's are rendered conductive, substantially the entire energizing voltage appears across the series impedances with the output terminals in effect being coupled to the reference potential.

It will be noted that one-half the energizing voltage in the nonconductive case appears across each semiconductor element. The voltage rating required for each element is determined not by the full voltage controlled, but only by one-half this voltage. This permits relatively inexpansive semiconductor elements to be employed in a given application. In addition, a plurality of switching circuits may be connected in parallel with the combination being coupled to a single energizing source. This configuration is found particularly useful in applications wherein the display device comprises a plurality of electroluminescent devices each of which is independently controlled.

Further features and advantages of the present invention will become more readily apparent when taken in conjunction with the accompanying drawings in which.

Figure 1:
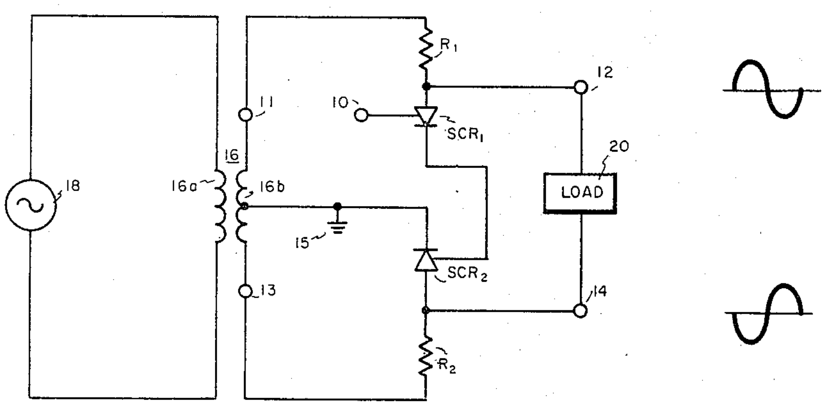
FIG. 1 is a schematic diagram of one embodiment of the invention.

Referring to FIG. 1, there is shown first and second silicon-controlled rectifiers $SCR_1$ and $SCR_2$. The gate of $SCR_1$ is coupled to switching signal terminal 10 and its cathode is coupled to the gate of $SCR_2$. The cathode of $SCR_2$ is then coupled to reference potential 15, i.e. ground.

The anode of $SCR_1$ is coupled in series with resistor $R_1$ which in turn is coupled to input terminal 11. Similiarly, the anode of $SCR_2$ is coupled in series with resistor $R_2$ which in turn is coupled to input terminal 13. The center-tapped secondary winding **16*b* of transformer 16 is coupled to input terminals 11 and 13. First and second output terminals 12 and 14, having load element 20 coupled therebetween, are shown coupled to the anodes of $SCR_1$ and $SCR_2$ respectively. In addition, an alternating source 18 is coupled in series with primary winding 16*a* of transformer 16 such that the output of source 18 is coupled to secondary winding 16*b*. The magnitude of the output signals appearing at first and second output terminals 12 and 14 is determined by the relative impedances of the SCR's, the utilization circuit or load coupled to the output terminals and the series resistors. The occurrence of the output signals is controlled by the application of a gate current to terminal 10. Although the circuit is shown having a single-ended switching signal terminal 10** to which a gate current is supplied, the gate current may also be provided by a current generator coupled between the gate of $SCR_1$ and the cathode of $SCR_2$.

Figure 2:
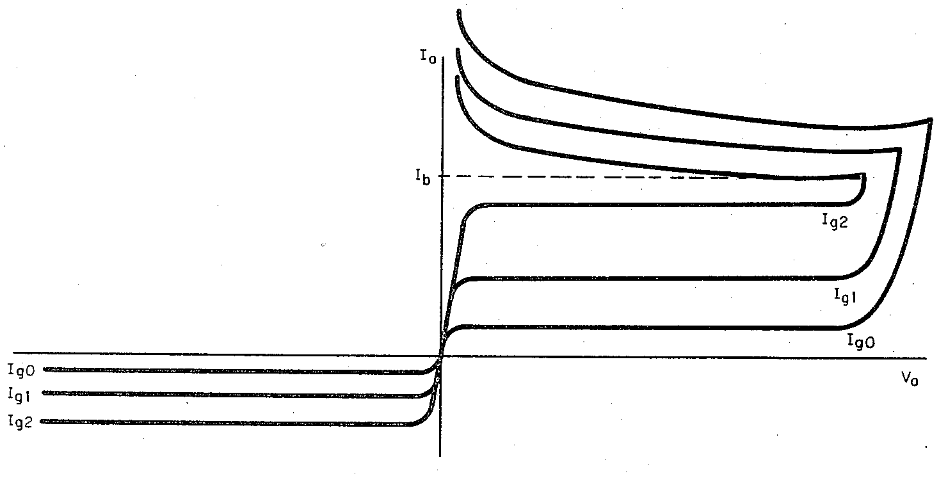
FIG. 2 shows the current-voltage characteristics of a typical silicon-controlled rectifier.

The operation of this circuit is best understood by first referring to FIG. 2 which shows current-voltage characteristic curves for a typical SCR. $I_a$ represents the current flowing in the anode of the SCR when a voltage $V_a$ is applied between anode and cathode and $I_g$ is the current flowing into the gate of the device. The curve labeled $I_{g0}$ represents the current-voltage characteristics when zero current flows into the gate and the curves designated $I_{g1}$ and $I_{g2}$ show the relationship between $V_a$ and $I_a$ when a relatively small gate current is flowing. The anode current $I_a$ is low (on the order of 10 to 200 microamperes) in the positive slope region prior to the negative slope or unstable region. For larger anode currents, an avalanche breakdown occurs within the SCR and the anode current is increased by several orders of magnitude as shown. The SCR has a particular anode current which must be exceeded in order to permit the SCR to operate as a bistable semiconductor element. If this anode-to-cathode current, shown in FIG. 2 as $I_b$, is not permitted to flow, the SCR can not be driven into the negative slope portion of its characteristic and therefore can not be driven into its avalanche state.

In the case of the circuit of FIG. 1, the operation of the SCRs is different from the above described conventional mode of operation because the resistors $R_1$ and $R_2$ are selected, for the particular voltage applied to the input terminals, to have an impedance that is too high to permit the current flowing through the SCR to exceed $I_b$. This prevents the SCR's from reaching the avalanche state. In practice, the resistors are selected to limit the anode to cathode current to values substantially below $I_b$ so that with a given applied voltage the operation of the SCR is limited to the lower portion of its characteristic. The impedances of $SCR_1$ and $SCR_2$ in the conducting and nonconducting states are approximately 10,000 ohms and 20 megohms respectively. The impedance of the series resistor required for this mode of operation is determined therefore by the peak magnitude of the applied voltage.

Figure 3:
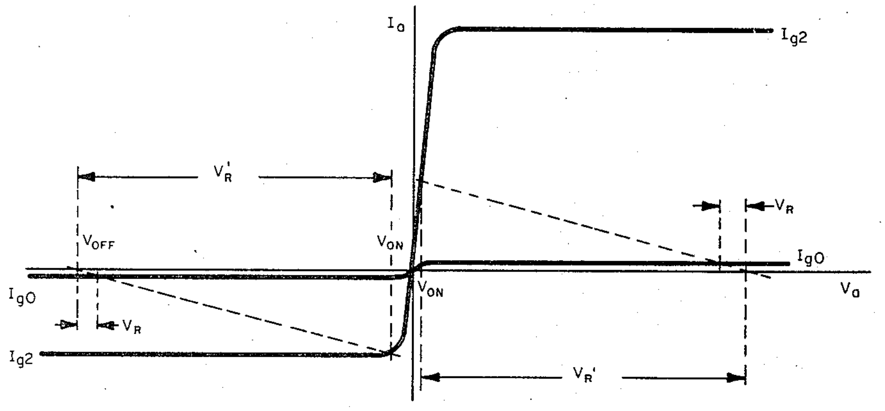
FIG. 3 is an enlarged view of a portion of the characteristics of FIG. 2.

In this mode of operation, connecting the circuit to A.C. supply 18 with no gate current (indicated by $I_{g0}$ in FIG. 3), the anode current is small. The alternating voltage across each SCR swings between the positive and negative values $V_{off}$ resulting in a negligible voltage $V_r$ appearing across the corresponding resistor and substantially the entire applied voltage appearing between the output terminals and across the load coupled therebetween. If now a current $I_{g2}$ flows into terminal 10 to the gate of $SCR_1$, the resistance of the SCR decreases and the voltage $V_a$ is reduced to a peak magnitude $\pm V_{on}$. Accordingly, most of the voltage generated across secondary winding 16*b* now appears across resistors $R_1$ and $R_2$ as shown by $V_{r'}$ in FIG. 3.

It will be noted that the gate current is applied only to $SCR_1$. This renders $SCR_1$ conductive with the result that anode-to-cathode current flows therein. This current is supplied to the gate of $SCR_2$ and renders it conductive. Since neither SCR enters the avalanche state, removal of the gate current source from terminal 10 causes both SCR's to become nonconductive regardless of the instantaneous polarity of the alternating voltage. Although the characteristic curves are not symmetrical about $V_a=0$, the voltage drop across each SCR, while conducting, is quite small and the output terminals are essentially at the reference potential.

The circuit of FIG. 1 controls an applied voltage that may be twice the rating of an individual SCR. The time required to render the SCR's conductive with a single switching signal is quite short, being about 10 microseconds. The anode-to-cathode current of each SCR when conducting is of the order of tens of microamperes.

In one embodiment tested and operated with an alternating volage of 400 volts peak at a frequency of 400 c.p.s. and an electroluminescent display device having an impedance of 3 megohms, the SCR's were chosen to be type 2N1956 having a current rating of 3 amperes and a voltage rating of 200 volts. The resistance of resistors $R_1$ and $R_2$ was 100 kilohms. The signals appearing at output terminals 12 and 14 when the SCR's were nonconductive were each 180 volts peak with a 180 degree phase difference therebetween. The SCR's were rendered conductive by a switching signal at terminal 10 of 1 milliampere and the signals at output terminals 12 and 14 were found to be 1 volt.

Figure 4:
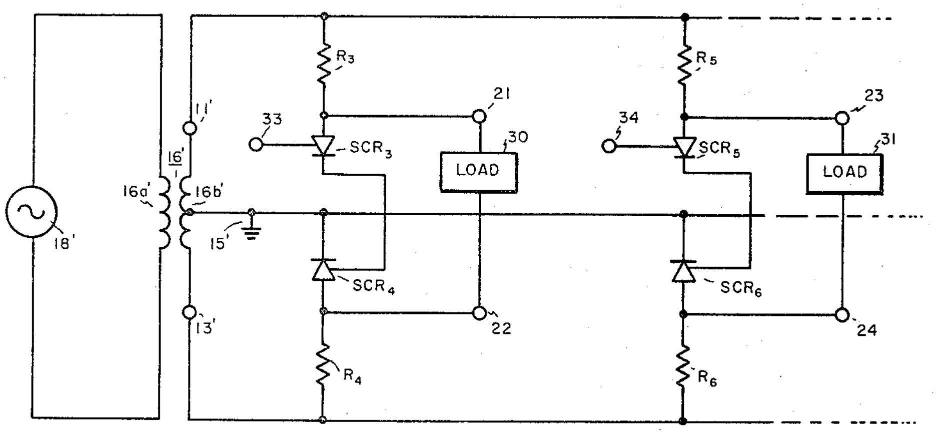
FIG. 4 is a schematic diagram of a second embodiment of the invention.

Referring to FIG. 4, two switching circuits are shown coupled in parallel between terminals 11' and 13'. An individual load 30 and 31, each of which may be a segment of an electroluminescent display, is coupled to the output terminals of each pair of SCR's. An A.C. energizing source is coupled to input terminals 11' and 13' by center-tapped secondary winding 16*b* of transformer 16'.

The individual pairs of SCR's, such as $SCR_3$ and $SCR_4$, are each provided with a switching signal terminal, such as terminal 33. The operation of each pair of SCR's is similar in all respects to the operation of the embodiment of FIG. 1 with the occurrence of the ouput signals at each pair of output terminals being independently controlled by the application of a gate current to the corresponding switching signal input terminal. Although the circuit of FIG. 4 shows two switching circuits, the number employed may be varied in accordance with the desired application.

While the above discussion has referred to specific embodiments, it is apparent that many variations and modifications may be made therein without departing from the spirit and scope of the invention.

What is claimed is:

1. A switching circuit which comprises:

(a) first and second input terminals;

(b) a first four-layer semiconductor element having anode, cathode, and gate electrodes;

(c) a second four-layer semiconductor element having anode, cathode, and gate electrodes, the gate electrode of said second element being coupled to the cathode electrode of said first element, the application of a signal between the gate electrode of said first element and the cathode of said second element rendering said first and second elements conductive;

(d) first and second impedance means, said first impedance means being coupled in series with the anode electrode of said first element and said first input terminal and said second impedance means being coupled in series with the anode electrode of said second element and said second input terminal;

(e) first and second output terminals coupled to the anode electrodes of said first and second semiconductor elements respectively; and (f) means for applying a signal between said first and second input terminals, said signal substantially appearing between said first and second output terminals in the absence of a signal at the gate electrode of said first element.

2. A switching circuit which comprises:

(a) a first four-layer semiconductor element having anode, cathode, and gate electrodes;

(b) a second four-layer semiconductor element having anode, cathode, and gate electrodes, the gate electrode of said second element being coupled to the cathode electrode of said first element, the application of a signal between the gate electrode of said first element and the cathode electrode of said second element rendering said first and second elements conductive;

(c) first and second input terminals;

(d) first and second impedance means, said first impedance means being coupled in series with the anode electrode of said first semiconductor element and said first input terminal, said second impedance means being coupled in series with the anode electrode of said second semiconductor element and said second input terminal, said impedances being relatively high as compared to the anode to cathode impedances of said elements when rendered conductive; and (e) first and second output terminals coupled to the anode electrodes of said first and second semiconductor elements, respectively, the application of a signal between said first and second input terminals resulting in said signal substantially appearing between said first and second output terminals in the absence of a signal at the gate electrode of said first element.

3. A switching circuit which comprises:

(a) a first four-layer semiconductor element having anode, cathode, and gate electrodes;

(b) a second four-layer semiconductor element having anode, cathode, and gate electrodes, the gate electrode of said second element being coupled to the cathode electrode of said first element, the cathode electrode of said second element being coupled to a reference potential, the application of a signal to the gate electrode of said first element rendering said first and second elements conductive;

(c) first and second input terminals;

(d) first and second impedance means, said first impedance means being coupled in series with the anode electrode of said first semiconductor element and said first input terminal, said second impedance means being coupled in series with the anode electrode of said second semiconductor element and said second input terminal, said impedances being relatively high as compared to the anode to cathode impedances of said elements when rendered conductive and relatively low as compared to the impedance of said load means;

(e) first and second output terminals coupled to the anode electrodes of said first and second semiconductor elements, respectively, and (f) load means coupled to said first and second output terminals, the application of a signal between said first and second input terminals resulting in said signal substantially appearing across said load means in the absence of a signal at the gate electrode of said first element.

4. A switching circuit which comprises:
(a) a first silicon-controlled-rectifier having anode, cathode and gate electrodes;
(b) a second silicon-controlled-rectifier having anode, cathode and gate electrodes, the gate electrode of said second rectifier being coupled to the cathode electrode of said first rectifier, the cathode electrode of said second rectifier being coupled to a reference potential, the application of a signal to the gate electrode of said first rectifier rendering both said rectifiers conductive;
(c) first and second input terminals;
(d) first and second resistors, said first resistor being coupled in series with the anode electrode of said first rectifier and said first input terminal, said second resistor being coupled in series with the anode electrode of said second rectifier and said second input terminal, the resistance of said resistors being relatively high as compared to the anode to cathode impedances of said rectifiers when rendered conductive such that said rectifiers are prevented from entering the avalanche state; and
(e) first and second output terminals coupled to the anode electrode of said first and second rectifiers, respectively, the application of a signal between said first and second input terminals resulting in said signal substantially appearing between said output terminals in the absence of a signal at the gate electrode of said first rectifier.

5. A switching circuit which comprises:
(a) a first silicon-controlled-rectifier having anode, cathode and gate electrodes;
(b) a second silicon-controlled-rectifier having anode, cathode and gate electrodes, the gate electrode of said second rectifier being coupled to the cathode electrode of said first rectifier, the cathode electrode of said second rectifier being coupled to a reference potential, the application of a signal to the gate electrode of said first rectifier rendering both said rectifiers conductive;
(c) first and second output terminals coupled to the anode electrodes of said first and second rectifiers, respectively;
(d) load means coupled to said first and second output terminals;
(e) first and second resistors coupled at one end to the anode electrodes of said first and second rectifiers, respectively, the resistance of said resistors being relatively high as compared to the anode to cathode impedances of said rectifiers when rendered conductive such that said rectifiers are prevented from entering the avalanche state, the resistance of said resistors being relatively low as compared to the impedance of said load means; and
(f) first and second input terminals coupled to the opposing ends of said first and second resistors, respectively, the application of a signal between said first and second input terminals resulting in said signal substantially appearing across said load means in the absence of a signal at the gate electrode of said first rectifier.

6. A switching circuit which comprises:
(a) a first silicon-controlled-rectifier having anode, cathode and gate electrodes;
(b) a second-silicon-controlled-rectifier having anode, cathode and gate electrodes, the gate electrode of said second rectifier being coupled to the cathode electrode of said first rectifier, the cathode electrode of said second rectifier being coupled to a reference potential, the application of a D.C. current to the gate electrode of said first rectifier rendering both said rectifiers conductive;
(c) first and second output terminals coupled to the anode electrodes of said first and second rectifiers, respectively;
(d) load means coupled to said first and second output terminals;
(e) first and second resistors coupled at one end to the anode electrodes of said first and second rectifiers, respectively, the resistance of said resistors being relatively high as compared to the anode to cathode impedances of said rectifiers when rendered conductive such that said rectifiers are prevented from entering the avalanche state, the resistance of said resistors being relatively low as compared to the impedance of said load means;
(f) first and second input terminals coupled to the opposing ends of said first and second resistors, respectively; and
(g) means for applying an alternating voltage between said first and second input terminals, said signal appearing across said load means in the absence of an applied current at the gate electrode of said first rectifier.

7. A switching circuit in accordance with claim 6 in which said means for applying an alternating voltage comprises a center-tapped transformer winding coupled between said first and second input terminals, said winding having an alternating voltage coupled thereto.

8. A switching circuit which comprises:
(a) a first silicon-controlled-rectifier having anode, cathode and gate electrodes;
(b) a second silicon-controlled-rectifier having anode, cathode and gate electrodes, the gate electrode of said second rectifier being coupled to the cathode electrode of said first rectifier, the cathode electrode of said second rectifier being coupled to a reference potential, the application of a signal to the gate electrode of said first rectifier rendering both said rectifiers conductive;
(c) first and second input terminals;
(d) first and second resistors, said first resistor being coupled in series with the anode electrode of said first rectifier and said first input terminal, said second resistor being coupled in series with the anode electrode of said second rectifier and said second input terminal, the resistance of said resistors being relatively high as compared to the anode to cathode impedances of said rectifiers when rendered conductive such that said rectifiers are prevented from entering the avalanche state;
(e) a third silicon-controlled-rectifier having anode, cathode and gate electrodes;
(f) a fourth silicon-controlled-rectifier having anode, cathode and gate electrodes, the gate electrode of said fourth rectifier being coupled to the cathode electrode of said third rectifier, the cathode electrode of said fourth rectifier being coupled to a reference potential, the application of a signal to the gate electrode of said third rectifier rendering both said rectifiers conductive;
(g) third and fourth resistors coupled in series with the anode electrode of said third and fourth rectifiers and the first and second input terminals, respectively, the resistance of said resistors being relatively high as compared to the anode to cathode impedances of said rectifiers when rendered conductive such that said rectifiers are prevented from entering the avalanche state;
(h) first and second output terminals coupled to the anode electrodes of said first and second rectifiers, respectively, the application of a signal between said first and second input terminals resulting in said signal substantially appearing between said output terminals in the absence of a signal at the gate electrode of said first rectifier; and (i) third and fourth output terminals coupled to the anode electrodes of said third and fourth rectifiers, respectively, the application of a signal between said first and second input terminals resulting in said signal substantially appearing between said output terminals in the absence of a signal at the gate electrode of said third rectifier.

No references cited.

ARTHUR GAUSS, *Primary Examiner.*

S. D. MILLER, *Assistant Examiner.*